Patented Dec. 26, 1922.

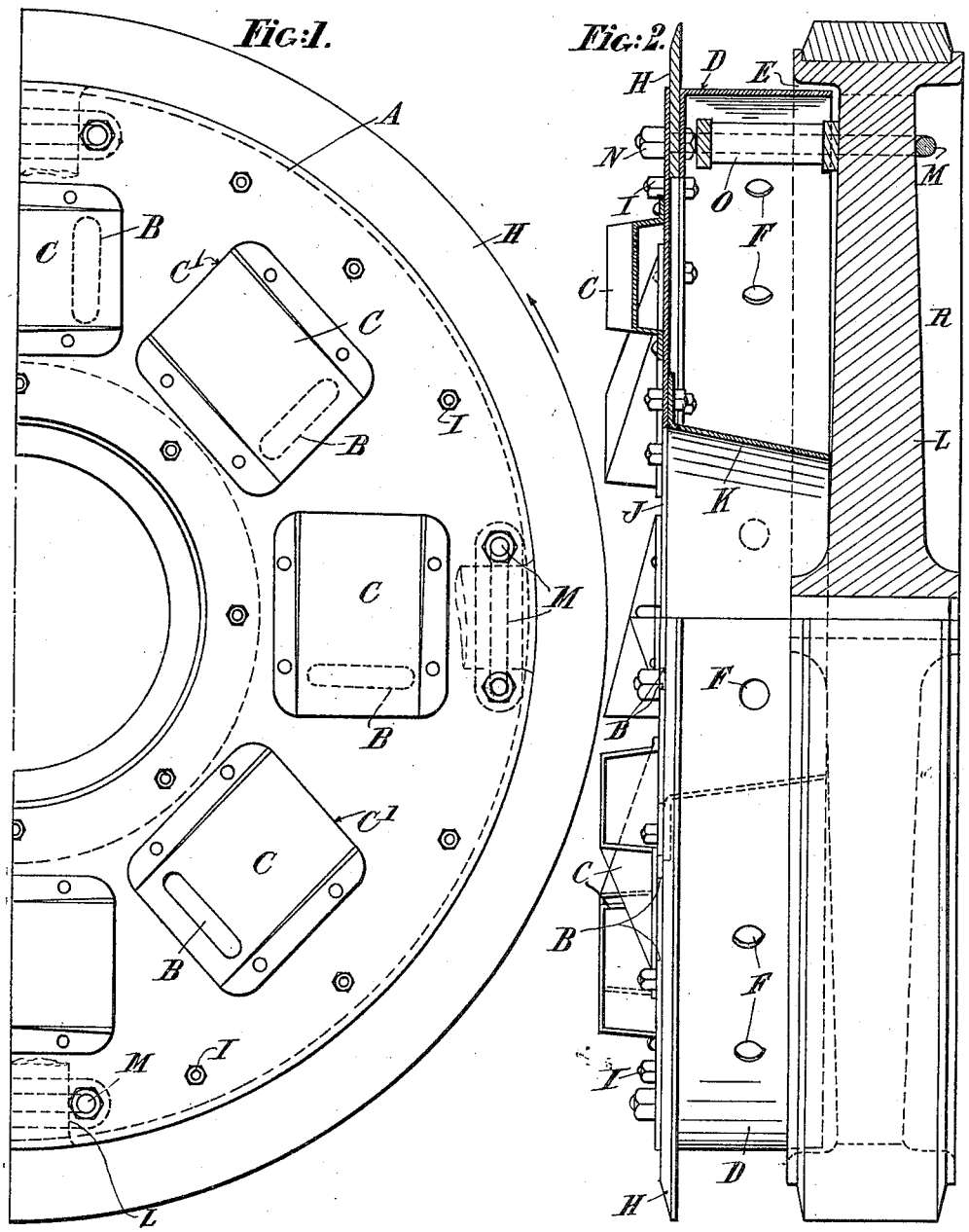

1,440,013

UNITED STATES PATENT OFFICE.

RICHARD JONES AND JOHN THOMAS RUTHERFORD, OF BYKER, NEWCASTLE-UPON-TYNE, ENGLAND.

DEVICE APPLICABLE TO VEHICLE WHEELS FOR ARRESTING LATERAL SPLASHING.

Application filed May 13, 1922. Serial No. 560,577.

*To all whom it may concern:*

Be it known that we, RICHARD JONES, of Byker, Newcastle-upon-Tyne, England, and JOHN THOMAS RUTHERFORD, of Byker, Newcastle-upon-Tyne, England, both British subjects, have invented a certain new and useful Improved Device Applicable to Vehicle Wheels for Arresting Lateral Splashing, of which the following is a specification.

The invention relates to a device applicable to the wheels of vehicles, more particularly the wheels of automobiles, and designed to arrest water or mud splashed outwards laterally by contact of the wheel with the road.

The device, which may be adapted for detachable connection or may form an integral part of the wheel, consists essentially of a disc adapted to be located at the side of the wheel to be guarded and of substantially the same diameter as the wheel tire, said disc having a perforated laterally projecting flange of smaller diameter which is adapted to fit with its edge against the rim of the vehicle, or in close proximity thereto to leave an annular gap, and said disc being provided with a series of apertures furnished with scoops or cowls designed to encourage the passage of air through such apertures into the interior of the flange.

By this means, with the wheel in motion, water or mud splashed outwards from the vehicle wheel is caught by the adjacent portion of the disc and at the same time the current of air passing through the apertures in the disc, and issuing radially outwards with a certain pressure either by way of the gap between the wheel and the flange, or through the perforations in the latter, or through both the gap and the perforations, tends to blow the water or mud downwards onto the road.

An embodiment of the invention designed for attachment to an existing wheel is illustrated in the accompanying drawings, in which—

Fig. 1 is a front elevation of one half of the device, and

Fig. 2 is a side view, partly in central section, showing the device attached to a vehicle wheel.

Referring to the drawings, A designates the disc having the series of apertures B covered by the cowls or scoops C which are open at the front C¹ and closed at the sides and rear, said cowls C being stamped out of the disc or being in the form of casings attached to the disc as shown.

D designates the annular flange or ring projecting laterally from the disc A, said flange being so arranged as to leave an annular clearance at E between its edge and the rim of the wheel R, this clearance affording a passage for the outlet of the air from the interior of the flange to the exterior. F, F designate apertures in the flange D which serve the same purpose as the passage E.

The rim of the disc A is preferably in the form of a ring H of rubber or other flexible material, said ring being detachably connected by bolts I between the disc and a lip on the flange D.

To clear the hub of the vehicle and give access thereto the disc is advantageously furnished with a central aperture J and with a second flange K which forms with the disc A and outer flange D three sides of a chamber bounded on the fourth side by the spokes L of the wheel or by the wheel disc, in the event of the wheel being of the disc type.

The device is shown attached to the wheel by U bolts M which embrace the spokes and are attached at their ends to the disc by nuts N, said bolts carrying distance sleeves O interposed between washers P. Any other suitable method of attachment may, however, be employed.

The device may form an integral part of the vehicle wheel or it may as shown form a separate unit for attachment.

As previously described, when in operation water or mud splashed outwards from the wheel R is trapped by the adjacent portion of the disc A or its peripheral attachment or ring H, whilst a current of air entering at B and issuing by way of the apertures E or F, or both, effectively blows back the water or mud onto the ground.

What we claim as our invention and desire to secure by Letters Patent of the United States is:—

1. Means for preventing lateral splashing from vehicle wheels comprising a disk, cowls thereon adapted on rotation of the disk to impel air radially therein and means for attaching said disk in laterally spaced relation to a vehicle wheel.

2. Means for preventing lateral splashing from vehicle wheels comprising a disk, having a flexible rim, cowls thereon, adapted on rotation of the disk to impel air radially therein and means for attaching said disk in laterally spaced relation to a vehicle wheel.

3. Means for preventing lateral splashing from vehicle wheels comprising a disk, cowls thereon adapted on rotation of the disk to impel air radially therein a perforated member projecting inwardly from said disk and means for attaching said disk in laterally spaced relation to a vehicle wheel.

In witness whereof we have signed this specification in the presence of two witnesses.

RICHARD JONES.
JOHN THOMAS RUTHERFORD.

Witnesses:
    B. W. ARMSTRONG,
    C. A. WALTER.